US010835985B2

(12) United States Patent
Miyata et al.

(10) Patent No.: US 10,835,985 B2
(45) Date of Patent: Nov. 17, 2020

(54) GAS-SHIELDED ARC WELDING METHOD

(71) Applicants: Kabushiki Kaisha Kobe Seiko Sho (Kobe Steel, Ltd.), Kobe-shi (JP); Mazda Motor Corporation, Aki-gun (JP)

(72) Inventors: Minoru Miyata, Kanagawa (JP); Reiichi Suzuki, Kanagawa (JP); Masaaki Tanaka, Hiroshima (JP); Mitsugi Fukahori, Higashihiroshima (JP); Takashi Ogawa, Hiroshima (JP)

(73) Assignees: Kabushiki Kaisha Kobe Seiko Sho (Kobe Steel, Ltd.), Kobe-shi (JP); Mazda Motor Corporation, Aki-gun (JP)

( * ) Notice: Subject to any disclaimer, the term of this patent is extended or adjusted under 35 U.S.C. 154(b) by 249 days.

(21) Appl. No.: 15/748,868

(22) PCT Filed: Jul. 27, 2016

(86) PCT No.: PCT/JP2016/071977
§ 371 (c)(1),
(2) Date: Jan. 30, 2018

(87) PCT Pub. No.: WO2017/022585
PCT Pub. Date: Feb. 9, 2017

(65) Prior Publication Data
US 2018/0221982 A1    Aug. 9, 2018

(30) Foreign Application Priority Data

Jul. 31, 2015 (JP) ................................. 2015-152378

(51) Int. Cl.
*B23K 9/173* (2006.01)
*B23K 35/02* (2006.01)
(Continued)

(52) U.S. Cl.
CPC .............. *B23K 9/173* (2013.01); *B23K 9/092* (2013.01); *B23K 9/23* (2013.01); *B23K 9/295* (2013.01);
(Continued)

(58) Field of Classification Search
CPC .......... B23K 9/173; B23K 9/092; B23K 9/23; B23K 9/295; B23K 35/0266; B23K 35/3093; B23K 35/0261; B23K 2103/04
See application file for complete search history.

(56) References Cited

U.S. PATENT DOCUMENTS 5,857,141 A       1/1999  Keegan et al.
2002/0017504 A1   2/2002  Toyoda et al.
(Continued)

FOREIGN PATENT DOCUMENTS

JP    56-169981 U    12/1981
JP    57-52274 U     3/1982
(Continued)

OTHER PUBLICATIONS

International Search Report dated Sep. 6, 2016 in PCT/JP2016/071977 (with English translation), 7 pages.
(Continued)

*Primary Examiner* — Janie M Loeppke
(74) *Attorney, Agent, or Firm* — Oblon, McClelland, Maier & Neustadt, L.L.P.

(57) ABSTRACT

A gas-shielded arc welding method includes feeding a consumable electrode via a welding torch and performing welding while flowing a shielding gas. The welding torch includes a nozzle. An inner diameter of the nozzle is 15 mm or more. A nozzle-base material distance between a tip of the nozzle and a material to be welded is 22 mm or less. A ratio expressed by (the inner diameter of the nozzle/the nozzle-base material distance) is 0.7 or more and 1.9 or less.

13 Claims, 3 Drawing Sheets

(51) Int. Cl.
*B23K 9/29* (2006.01)
*B23K 9/09* (2006.01)
*B23K 9/23* (2006.01)
*B23K 35/30* (2006.01)
*B23K 103/04* (2006.01)

(52) U.S. Cl.
CPC ...... B23K 35/0266 (2013.01); B23K 35/3093 (2013.01); *B23K 35/0261* (2013.01); *B23K 35/30* (2013.01); *B23K 35/302* (2013.01); *B23K 2103/04* (2018.08)

(56) References Cited

U.S. PATENT DOCUMENTS

| 2007/0051703 | A1* | 3/2007 | Neff | B23K 9/173 219/74 |
| 2008/0142490 | A1* | 6/2008 | Suzuki | B23K 9/09 219/74 |
| 2010/0133240 | A1* | 6/2010 | Takahashi | B23K 9/173 219/74 |

FOREIGN PATENT DOCUMENTS

| JP | 5-50247 A | 3/1993 |
| JP | 5-305476 A | 11/1993 |
| JP | 7-232294 A | 9/1995 |
| JP | 9-239545 A | 9/1997 |
| JP | 10-76392 A | 3/1998 |
| JP | 10-225771 A | 8/1998 |
| JP | 2001-105148 A | 4/2001 |
| JP | 2002-28785 A | 1/2002 |
| JP | 2007-44736 A | 2/2007 |
| JP | 2009-142850 A | 7/2009 |
| JP | 2015-80807 A | 4/2015 |

OTHER PUBLICATIONS

Written Opinion of the International Searching Authority dated Sep. 6, 2016 in PCT/JP2016/071977 (with English translation), 12 pages.
JIS Z 3312: 2009, Solid Wires for MAG Welding and MIG Welding for Mild Steel, High-Tensile Steel and Low Temperature Steel, JSA foundation, 2009, p. 4, issued on Jan. 31, 2017, (with English Translation).
Latest Situation of Welding Material Standard (ISO/AWS/JIS)—JIS Z 3310, Solid Wires for Metal Active Gas Welding and Metal Inert Gas Welding for Mild Steel, High-Tensile Steel and Low Temperature Steel—Technical Committee of Welding Consumables Division of the Japan Welding Engineering Society, Welding Technology, Sanpo Publications, Inc, Issued on Jul. 2013, vol. 61 issue 7, p. 92-95 (with English Translation).
"The Japan Welding Engineering Society Welding Rod Division Technical Committee, Explanation of the Revised Contents of JIS for Welding Materials No. 2—JIS Z 3312 Solid Wires for MAG Welding and MIG Welding for Mild Steel, High-Tensile Steel and Low Temperature Steel-, <online>, Mar. 2009, <URL : http://www-it.jwes.or.jp/technology/3_3.html>" (with English Translation).
The Japan Welding Engineering Society Welding Rod Division Technical Committee, Explanation of the Revised Contents of JIS for Welding Materials—JIS Z 3312 Solid Wires for MAG Welding and MIG Welding for Mild Steel, High-Tensile Steel and Low Temperature Steel-, <online>, Mar. 2009, <http://www-it.jwes.or.jp/technology/images/3_table4.pdf>(with English Translation).
"Brief Welding Handbook, 4th edition, Songtao Hong, Weihua Peng, Jialong Zhang, Peirong Cao, eds., Shanghai Science and Technology Press, May 1987" (with English Translation).

* cited by examiner

GAS-SHIELDED ARC WELDING METHOD

TECHNICAL FIELD

The present invention relates to a gas-shielded welding method, and more particularly to a gas-shielded arc welding method that can suppress oxidation phenomenon on welding bead surfaces due to oxygen in the atmospheric air and formation of convex bead shape. The present invention further relates to a weldment obtained using the gas-shielded arc welding method and a method for producing the same.

BACKGROUND ART

General role of a shielding gas in a gas-shielded arc welding is to shield arc, a molten metal and a consumable electrode from the atmospheric air and prevent a welded part from nitration and oxidation. However, when a shielding gas is disturbed by external factors such as wind and execution conditions such as torch posture, nitrogen in the atmospheric air is mixed in a molten metal during welding. By this, welding defects such as pits or blow holes are generated. Furthermore, when oxygen in the atmospheric air is mixed in a molten metal, welding bead shape becomes convex, and furthermore when the amount of oxygen in a molten metal increases, excessive slag is formed on bead surfaces after welding.

To prevent welding defects, formation of convex welding bead and generation of slag, a perforated member is provided at a discharge port side of a nozzle as a function of shielding the atmospheric air in Patent Document 1. By providing the perforated member, a shielding gas is rectified by a differential pressure, and flow rate distribution and the like of the shielding gas can be further uniformed.

Patent Document 2 discloses the condition that a straight portion Dp and a throttle part are provided in a gas nozzle and the relationship between an inner diameter Do of the throttle part and an axis direction length L thereof satisfies a specified value ($1.5 \leq (Dp/Do) \leq 2.5$, $1.0 \leq (L/Dp)$). It further describes that, by this, the welded part can be satisfactorily shielded by a shielding gas, entrainment of oxygen (O) and nitrogen (N) in the atmospheric air is suppressed, and excellent weld structure can be obtained.

PRIOR ART DOCUMENTS

Patent Document

Patent Document 1: JP-A-2015-80807
Patent Document 2: JP-A-2002-28785

SUMMARY OF THE INVENTION

Technical Problems

Patent Document 1 and Patent Document 2 relate to a structure of a gas nozzle, and are to suppress entrainment of oxygen and nitrogen in the atmospheric air from the standpoint of a flow of a gas.

However, those documents do not consider a reaction with oxygen at a high temperature part of a molten metal, and the nozzle is a small-diameter nozzle. For this reason, a shielding region is limited, and it is difficult to suppress an oxidation reaction of a molten metal of high temperature during high speed welding.

Furthermore, regarding nitrogen in the atmospheric air, a method of suppressing pits or blow holes by adding Al or Ti that is easy to react with nitrogen to a consumable electrode, thereby forming a nitride, is exemplified as a countermeasure in the case of entrainment of the atmospheric air. However, a method of suppressing slag formed by an oxidation reaction by oxygen in the atmospheric air has not been reported heretofore.

In the background art, even in a case where an area just under a torch is shielded, a weld metal just after passing through the torch becomes outside the shielding range, and the weld metal has the state exposed to the atmospheric air. The weld metal just after passing through the torch already solidifies, but the temperature of its bead surfaces is high. Therefore, a reaction rate with oxygen in the atmospheric air is fast, and the surfaces are under the situation that slag is easy to be formed. This is a problem particularly remarkable in the welding of high speed welding.

In view of the above actual situations, the present invention provides a gas-shielded arc welding method that suppresses oxidation on bead surfaces just after welding or oxidation in the case where the atmospheric air has been entrained while increasing the atmospheric air shielding effect by a shielding gas, and makes it possible to reduce slag.

Solution to Problems

As a result of intensive investigations, the present inventors have found that the above problems can be solved by defining an inner diameter of a nozzle and setting a suitable nozzle-base material distance corresponding to the inner diameter, and have completed the present invention.

That is, the present invention relates to the following [1] to [10].

[1] A gas-shielded arc welding method comprising feeding a consumable electrode via a welding torch and performing welding while flowing a shielding gas,
wherein the welding torch includes a nozzle,
an inner diameter of the nozzle is 15 mm or more,
a nozzle-base material distance between a tip of the nozzle and a material to be welded is 22 mm or less, and
a ratio expressed by (the inner diameter of the nozzle/the nozzle-base material distance) is 0.7 or more and 1.9 or less.

[2] The gas-shielded arc welding method according to [1], wherein a flow rate of the shielding gas is 18 L/min or less.

[3] The gas-shielded arc welding method according to [1] or [2], wherein a ratio expressed by (flow rate of the shielding gas/the inner diameter of the nozzle) is 0.65 L/min·mm or more and 1.10 L/min·mm or less.

[4] The gas-shielded arc welding method according to any one of [1] to [3], wherein the shielding gas contains 92% or more of Ar, and the balance is at least one of carbon dioxide and oxygen, and inevitable impurities.

[5] The gas-shielded arc welding method according to any one of [1] to [4], wherein the consumable electrode contains S in an amount of 0.015 mass % or more based on an entire mass thereof.

[6] The gas-shielded arc welding method according to any one of [1] to [5], wherein an average welding current is 250 A or less.

[7] The gas-shielded arc welding method according to any one of [1] to [6], wherein pulse current control in which a peak current is 380 A or more and 530 A or less and a peak width is 0.5 to 2.0 milliseconds is performed.

[8] The gas-shielded arc welding method according to any one of [1] to [7], wherein a zinc-plated steel sheet having a basis weight of zinc plated of 20 to 100 g/m$^2$ or more is used as the material to be welded.

[9] A method for producing a weldment, comprising a step of welding by the gas-shielded arc welding method according to any one of [1] to [8].

[10] A weldment welded by the gas-shielded arc welding method according to any one of [1] to [8].

Advantageous Effects of the Invention

In the present invention, entrainment of the atmospheric air can be suppressed and the oxygen amount and nitrogen amount in a molten metal can be maintained at low level by defining an inner diameter of a nozzle in a welding torch and setting a suitable nozzle-base material distance corresponding to the inner diameter. As a result, blow holes due to nitrogen, and formation of a convex bead shape and increase of slag due to oxygen can be suppressed.

Furthermore, when a prescribed amount of sulfur (S) is contained in a consumable electrode (hereinafter sometimes referred to as a welding wire), S is preferentially surface-adsorbed on a molten pool just under an arc, an oxidation reaction on bead surfaces just after welding or in the case where the atmospheric air has been entrained is suppressed, and slag formed on bead surfaces after welding can be further suppressed.

DESCRIPTION OF EMBODIMENTS

Embodiments for carrying out the present invention are described in detail below. However, the present invention is not limited to the embodiments described below.

The gas-shielded arc welding method in the present invention is a gas-shielded welding method including feeding a consumable electrode via a welding torch and performing welding while flowing a shielding gas, in which the welding torch includes a nozzle, an inner diameter of the nozzle is 15 mm or more, a nozzle-base material distance between a tip of the nozzle and a material to be welded is 22 mm or less, and a ratio expressed by (the inner diameter of the nozzle/the nozzle-base material distance) is 0.7 or more and 1.9 or less.

[Welding Apparatus]

A welding apparatus that can be used in the gas-shielded arc welding method in the present invention is described below. The welding apparatus is not particularly limited so long as it is a welding apparatus that performs gas-shielded arc welding, and welding apparatuses used in conventional gas-shielded arc welding can be used.

Figure 1:
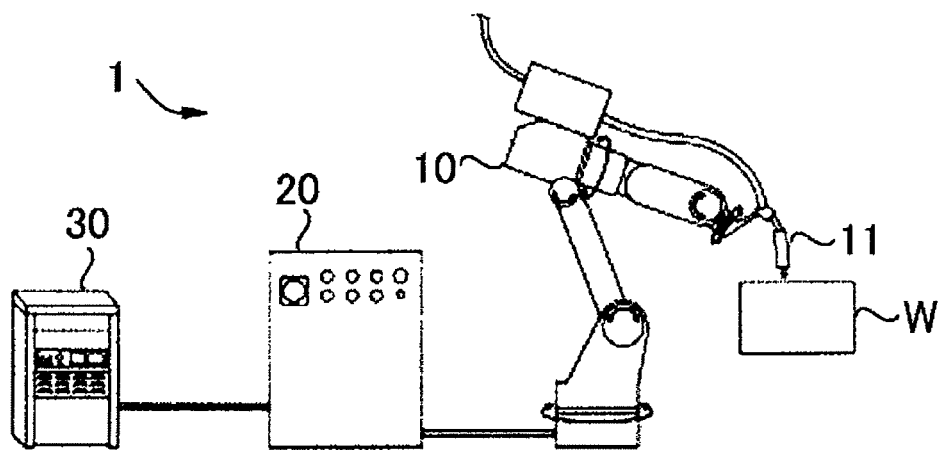
FIG. 1 is an entire constitution diagram showing an example of an apparatus used in the welding method in the present invention.

For example, as shown in FIG. 1, a welding apparatus 1 includes a welding torch 11 provided at a tip thereof, a robot 10 that moves the welding torch 11 along a welding line of a material to be welded (hereinafter referred as a "work" or "base material") W, a wire feed unit (not shown) that feeds a welding wire to the welding torch 11, and a welding power supply unit 30 that feeds a current to a consumable electrode via the wire feed unit and generates arc between the consumable electrode and the material to be welded. The welding apparatus further includes a robot control unit 20 that controls robot operation for moving the welding torch 11.

<Welding Torch>

Figure 2:
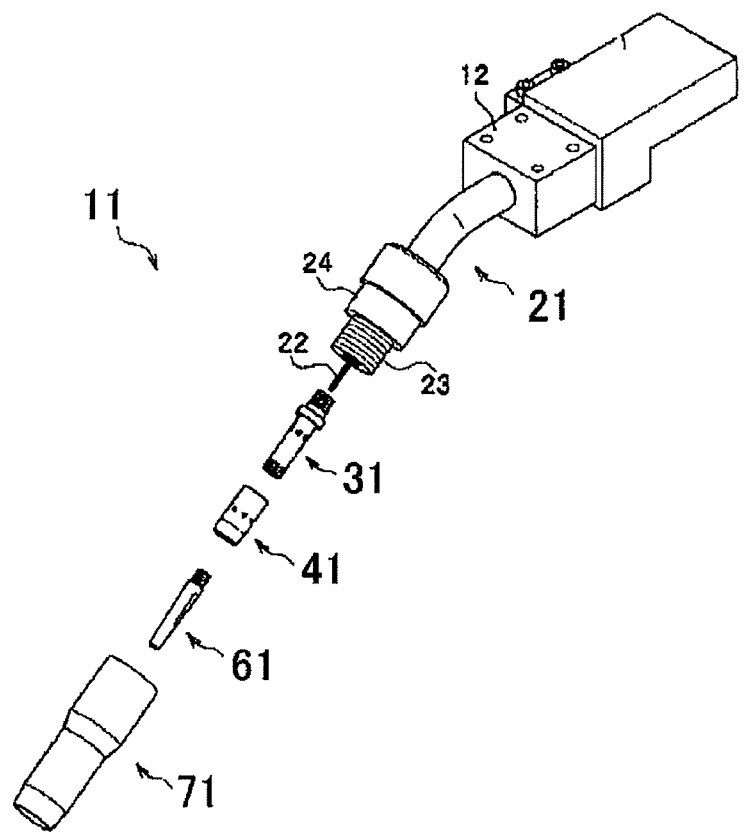
FIG. 2 is a structural diagram showing an example of a welding torch used in the welding method in the present invention.

As shown in FIG. 2, the welding torch 11 performs arc welding by automatically feeding a welding wire in a cylinder and using the welding wire. The welding torch 11 includes a torch clamp 12. The torch clamp 12 fixes the welding torch 11 to the robot.

A torch barrel 21 is supported by the torch clamp 12, and additionally includes a mechanism of supporting a nozzle 71 and a chip body 31. The torch barrel 21 can feed the welding wire to be fed to a tip of the chip body 31 (a rear end of a contact chip 61) via an inner tube 22 in the state of having been provided with the chip body 31. The torch barrel 21 supplies welding current to the chip body 31, and further feeds a shielding gas to a space formed between the inner tube 22 and the chip body 31. The chip body 31 includes an orifice 41 and a mechanism of supporting the contact chip 61. The chip body 31 is formed of a material having conductivity, such as a metal.

The orifice 41 includes a mechanism of rectifying a shielding gas. Specifically, the orifice 41 generally has a cylindrical shape, and is mounted by inserting from the tip side of the outer circumference of the chip body 31. The contact chip 61 supplies welding current to the welding wire and additionally includes a mechanism of guiding the welding wire to a work of a material to be welded. Similar to the chip body, the contact chip 61 is formed of a material having conductivity, such as a metal.

The posture of the welding torch may be vertical to a base material and may be inclined.

In a case where the welding torch is inclined toward the side opposite a movement direction of the welding, an angle formed by a vertical line to the base material and the torch is called a sweep-forward angle, and in a case where the welding torch is inclined toward the movement direction of welding, an angle formed by the vertical line to the base material and the torch is called a sweep-back angle.

Shielding property during arc welding can be increased further effectively by giving a sweep-forward angle to the welding torch. Furthermore, the rear of beads can be shielded by giving a sweep-back angle to an electrode, and as a result, an oxidation reaction of beads just after welding can be suppressed.

To obtain appropriate weld penetration on a welding line and good bead shape, it is preferred to perform the welding in a range such that the sweep-forward angle is −15° to 40°, that is, the upper limit of the sweep-forward angle is 40° and the upper limit of the sweep-back angle is 15°.

<Nozzle>

The nozzle 71 includes a mechanism of jetting a shielding gas such as argon (Ar) or carbon dioxide gas ($CO^2$) fed from a gas feed apparatus not shown to a base material to be welded. The nozzle 71 is formed into a cylindrical shape having an inner space capable of housing the chip body 31, the orifice 4l and the contact chip 61 that are in an integrally assembled state therein.

In the nozzle 71, a female thread portion (not shown) with which a male thread portion 23 formed at the tip of the torch barrel 21 is engaged is formed inside the rear end. By this structure, the nozzle 71 can shield the welding part from the atmospheric air by using a shielding gas rectified by the orifice 41.

(Inner Diameter of Nozzle and Nozzle-Base Material Distance)

Figure 3:
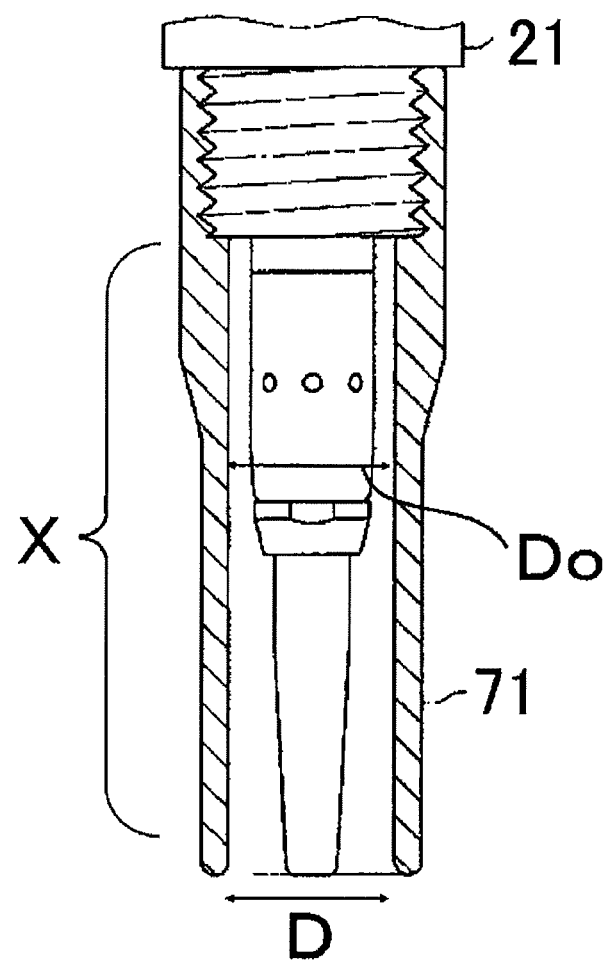
FIG. 3 is a structural diagram showing an example of a nozzle part used in the welding method in the present invention.

An example of a nozzle shape is shown in FIG. 3. Inner diameter Do of a straight portion X in the nozzle (hereinafter sometimes simply referred to as a "straight portion") and inner diameter D of a nozzle port (hereinafter sometimes simply referred to as an "inner diameter of a nozzle") affect a shielding range and a shielding property.

The role of the shielding gas in gas-shielded arc welding is to shield arc, and a molten metal and welding wire exposed to high temperature, from the atmospheric air, thereby preventing the welding part from nitration and oxidation.

Nitrogen is not generally added to a shielding gas and partial pressure thereof in the shielding gas is very low. It is therefore considered that even if the atmospheric air is slightly entrained, nitrogen does not directly dissolve in molten steel.

Specifically, it is considered that the cause of dissolving nitrogen in molten steel is that by mixing nitrogen in the arc atmosphere, $N_2$ is decomposed to N, N partial pressure is increased and N is incorporated from local molten steel heated to high temperature by arc.

In other words, to control nitrogen in a molten metal, it is necessary to prevent incorporation of nitrogen into the arc atmosphere. Therefore, conventionally laminar flow stability of shielding gas flow has been more important than the breadth of a shielding region, and a small diameter nozzle in which flow rate is further fast and turbulent flow is difficult to be generated has been used. Furthermore, a small diameter nozzle has been preferred in order to penetrate in narrow welding portion.

As the conventional method, specifically, as described in, for example, Patent Document 2, an inner diameter of a nozzle port is drawn to be smaller than an inner diameter of a straight portion, thereby sharpening a gas jetted and increasing directivity. Thus, conventionally the inner diameter D of a nozzle was drawn to make small, thereby increasing shielding property.

On the other hand, convex welding bead shape is formed and slag is generated by oxygen (O), but it is necessary to positively add oxygen to the shielding gas from the standpoint of arc stability, and as a result, O partial pressure in the arc atmosphere is always high. For this reason, to decrease the amount of oxygen in a molten metal, it is necessary to protect the entire molten pool by a shielding gas not only during arcing. As the protection method, it is considered that the welding is performed while maintaining a shielding gas flow in a laminar flow over a wide range.

However, when the inner diameter D of a nozzle is small as in the background art, an area that can be shielded is small, and a wide range cannot be covered. In other words, if the range that can be shielded cannot be maintained wide, the molten metal just after passing through the torch is exposed to the atmospheric air in higher temperature state. As a result, an oxidation reaction on bead surface is accelerated, and convex welding bead shape is formed and slag is generated. Furthermore, even in the case of containing a prescribed amount of S in a consumable electrode (welding wire) described hereinafter, the effect by S cannot be effectively exhibited.

In view of the above, in the present invention, the inner diameter D of the nozzle is 15 mm or more in order to widen the range to be shielded. However, only by increasing the inner diameter of the nozzle in order to ensure shielding property over a wide range, the shielding gas becomes turbulent flow prior to reaching the molten metal, and there is a possibility that the shielding property is deteriorated.

In view of the above, a distance between the tip of nozzle and a material to be welded (base material) (nozzle-base material distance) is 22 mm or less, and additionally a ratio expressed by (inner diameter D of nozzle/nozzle-base material distance) is 0.7 or more and 1.9 or less.

When the nozzle inner diameter D, the nozzle-base material distance and the ratio expressed by (inner diameter D of nozzle/nozzle-base material distance) fall within the above ranges, both wide shielding range and high shielding property can be achieved. In other words, the oxygen amount and nitrogen amount in the molten metal are maintained at low level, and blow holes due to nitrogen, the formation of convex welding bead shape and the increase of slag, due to oxygen, can be suppressed.

When the inner diameter D of the nozzle is smaller than 15 mm, the range that can be shielded becomes narrow, and a large amount of slag is formed by an oxidation reaction of the molten metal just after passing through the torch. The inner diameter D of the nozzle is preferably 16 mm or more, and more preferably 18 mm or more.

On the other hand, as the upper limit of the inner diameter D of the nozzle, it is preferably 30 mm or less, and more preferably 22 mm or less. When the diameter exceeds 30 mm, there is a case that directivity of the gas jetted is deteriorated, resulting in the deterioration of shielding property, although depending on flow rate of the shielding gas. In such a case, the formation of slag, and welding defects such as pits and blow holes may be generated by entrainment of the atmospheric air.

In the present invention, the relationship between the inner diameter Do of the straight portion and the inner diameter D of the nozzle port is not particularly limited, and when the inner diameter D of the nozzle port is 15 mm or more, the inner diameter Do of the straight portion may be larger or smaller than the inner diameter D, and may be the same as the inner diameter D. However, from the standpoint of directivity of the shielding gas, it is preferred from the standpoint of the increase of shielding property that the ratio (D/Do) between the inner diameter Do of the straight portion and the inner diameter D of the nozzle port falls within the range of 0.5 to 1.0.

From the standpoint of more effectively obtaining the above effects, the nozzle-base material distance is preferably 20 mm or less, more preferably 17 mm or less, and still more preferably 15 mm or less. As the lower limit of the nozzle-base material distance, it is preferably 12 mm or more from the standpoint of nozzle clogging by spattering.

The ratio expressed by (inner diameter D of nozzle/nozzle-base material distance) is preferably 1 or more, and is preferably 1.6 or less, from the standpoint of more effectively achieving the above effects.

<Shielding Gas>

The shielding gas used in the gas-shielded arc welding method in the present invention is not particularly limited, and Ar gas, carbon dioxide gas (carbon dioxide, $CO_2$), oxygen gas ($O_2$) and mixed gases of those can be used. Those gases may contain $N_2$, $H_2$ and the like as impurities.

Even in the welding using 100% $CO_2$ as a shielding gas, the effects of suppressing entrainment of the atmospheric air and preventing an oxidation reaction can be achieved in the gas-shielded arc welding method in the present invention. However, when Ar gas or Ar-containing mixed gas is used as the shielding gas, it is possible to further reduce an oxidation reaction of a molten metal. Therefore, it is preferred to use Ar gas (100% Ar) or Ar-containing mixed gas as the shielding gas.

In the case of Ar-containing mixed gas, it is preferred that the content of carbon dioxide is 0 to 40 vol % and the content of oxygen is 0 to 10 vol %. It is more preferred that Ar is contained in an amount of 92 vol % or more and the balance is at least one of carbon dioxide and oxygen, and inevitable impurities. It is still more preferred that the Ar content is 95 vol % or more.

Examples of the impurities include $N_2$ and $H_2$, and it is most preferred that the impurities are not entirely contained (0 vol %).

The flow rate of the shielding gas is more preferably 25 L/min or less, and still more preferably 18 L/min or less, although depending on the inner diameter D of the nozzle and the value of the nozzle-base material distance. This can prevent excessive high flow rate of the shielding gas and suppress entrainment of the atmospheric air in the shield atmosphere by high speed gas flow.

The flow rate of the shielding gas is preferably 8 L/min or more, and more preferably 10 L/min or more, from the standpoint of porosity resistance.

When the ratio (flow rate) expressed by (flow rate of shielding gas/inner diameter D of nozzle) is 0.65 L/min·mm or more and 1.10 L/min·mm or less, it is preferred from the standpoint that entrainment of the atmospheric air by high speed gas flow can be further suppressed. The flow rate is more preferably 0.75 L/min·mm or more, and is more preferably 1.00 L/min·mm or less.

<Consumable Electrode (Welding Wire)>

The kind of the welding wire may be a solid wire as copper wire, and may be flux-cored welding wire including a cylindrical sheath and flux with which the inside of the sheath is filled. The welding wire is not particularly limited. In the case of a flux-cored welding wire, the wire may be any form of a seamless type free of a seam on the sheath and a seam type having a seam on the sheath. Furthermore, copper plating may be applied or may not be applied to the surface of the welding wire (the outside of the sheath in the case of a flux-cored welding wire).

(S: 0.015 Mass % or More)

It is preferred that, in the welding wire in the present invention, an appropriate amount of sulfur (S) is added thereto.

S is originally an impurity element as is the case with phosphor (P), and it is preferred to reduce the content as possible. However, S in molten iron has the property of easily adsorbing to the surface of the molten iron, and has the properties of decreasing surface tension. In view of this, a range of an appropriate amount of S in the molten wire was defined based on the following mechanism by focusing on and utilizing this property in the present invention.

By welding with the welding wire of the present invention, S atoms selectively adsorb to the surface of a molten pool. When the shielding range of the shielding gas is narrow, O atoms also adsorb to the surface of a molten pool, as is the case with the S atoms. Therefore, to cover the surface of a molten pool with S atoms, it is necessary that the inner diameter D of the nozzle port is 15 mm or more as described above, thereby increasing the shielding range and shielding property.

Figure 4:
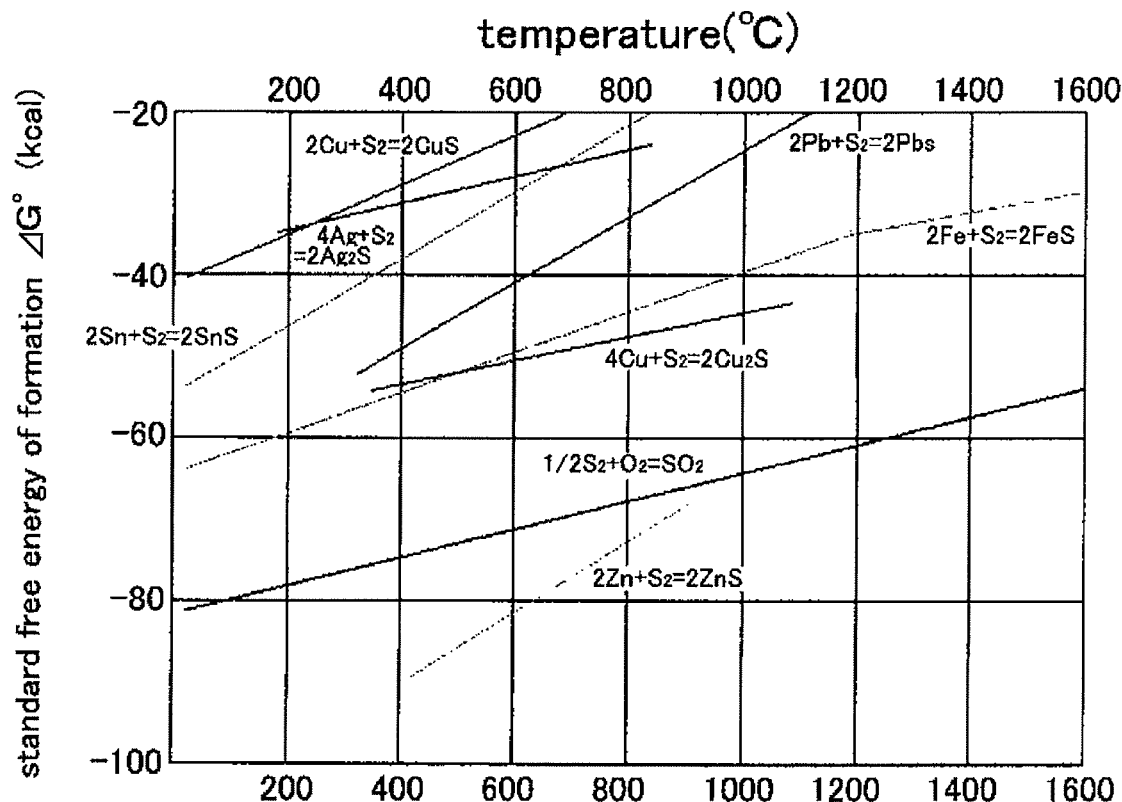
FIG. 4 is a graph showing chemical potential of various sulfides.

Even though the surface of a molten pool or bead surfaces covered with S atoms have been exposed to oxygen in the atmospheric air, S reacts with oxygen in the atmospheric air by the reaction of $\frac{1}{2}S_2+O_2=SO_2$ to form $SO_2$ (boiling point: −10° C.) as shown in the chemical potential diagram of various sulfides in FIG. 4, and $SO_2$ gasifies. For this reason, an oxidation reaction of Fe, Mn or the like on the bead surfaces just after welding or in a case where the atmospheric air has been entrained is suppressed, and slag formed on the bead surfaces after welding can be further suppressed.

The points to focus on are that the reaction of $\frac{1}{2}S_2+O_2=SO_2$ is stable as compared with the reaction of iron sulfide $2Fe+S_2=2FeS$, and the boiling point of $SO_2$ is −10° C. In other words, in a broad temperature range of from just after welding to room temperature, a reduction reaction of FeS acts, and the oxidation reaction of Fe is suppressed. Furthermore, $SO_2$ formed can easily escape in the atmospheric air.

Along the above mechanism, in order that surface adsorption phenomenon of S selectively works to make sure surface adsorption to the molten pool, it is preferred in the present invention that the S amount is 0.015 mass % or more based on the entire mass of the consumable electrode (welding wire). The S amount is more preferably 0.020 mass % or more. On the other hand, as the upper limit of the S amount, it is preferably 0.080 mass % or less from the standpoint of preventing the generation of cracking in a weld metal.

The surface adsorption of S cannot directly be observed. Therefore, the surface adsorption is generally indirectly judged by surface tension or a gas adsorption reaction. When the S amount in the welding wire is lower than 0.015 mass %, the spread of bead shape affected by surface tension is not observed, and slag is generated. Therefore, there is a case that oxidation suppression effect by adsorption phenomenon of S does not appear. On the other hand, when the amount of S in the welding wire exceeds 0.080 mass %, welding defects such as high temperature cracking may be generated.

Other components that may be contained in the welding wire and the numerical ranges thereof (amounts of components) are described below together with the reasons of limitation. Unless otherwise indicated, the amounts of components are defined as the proportion to the entire mass of the welding wire. When the welding wire is a flux-cored welding wire, the amounts of components are expressed by the total of the amounts of components in the sheath and flux.

(C: 0.30 Mass % or Less (Including 0 Mass %))

C in the welding wire and weld metal is effective for increasing strength of the weld metal. Regarding spattering, even though the content of C is small, there is no problem, and therefore, the upper limit is not set. However, when C is contained in a large amount exceeding 0.30 mass %, C bonds to a slight amount of oxygen during welding to form CO gas, thereby generating bubbles on droplet surfaces, leading to the generation of spatter and the occurrence of arc instability.

When arc instability is occurred, the atmospheric air may be entrained by disturbance of the shielding gas, and there is a possibility that welding defects such as blow holes and the generation of large amount slag occur. For this reason, the C content is preferably 0.30 mass % or less. On the other hand, the C content is preferably 0.01 mass % or more for ensuring strength.

(Si: 0.20 to 2.50 Mass %)

Si in the welding wire is a deoxidizing element, and is a preferable element for ensuring strength and rigidity of the weld metal. When the amount of Si added is small, blow holes may be generated by insufficient deoxidization. Therefore, it is preferred to contain Si in an amount of 0.20 mass % or more. However, when Si is contained in a large amount exceeding 2.50 mass %, slag that is difficult to separate is generated in a large amount during welding, and welding defects such as entrainment of slag are generated. For this reason, it is preferred that the Si content falls within a range of 0.20 to 2.50 mass %.

(Mn: 0.50 to 3.50 Mass %)

Similar to Si, Mn in the welding wire is preferable for exhibiting the effect as a deoxidizing agent or a sulfur scavenger and ensuring strength and rigidity of the weld metal. It is preferred to contain Mn in an amount of 0.50 mass % or more for preventing the occurrence of welding defects by insufficient deoxidization. On the other hand, when Mn is contained in a large amount exceeding 3.50 mass %, slag that is difficult to separate is generated in a large amount during welding, and welding defects such as entrainment of slag are generated. Furthermore, strength is excessively increased, leading to excessive deterioration of rigidity of the weld metal. For this reason, it is preferred that the Mn content falls within a range of 0.50 to 3.50 mass %.

(P: 0.0300 Mass % or Less (Including 0 Mass %))

P is an impurity element, and it is preferred that the content thereof is decreased as possible. For this reason, the lower limit is not set. When P is present in a large amount exceeding 0.0300 mass %, there is a possibility that welding defects such as cracking of the weld metal are generated. For this reason, it is preferred that the P content falls within a range of 0.0300 mass % or less (including 0 mass %).

Other than the above elements, Ni, Cr, Mo, B and the like can be added in appropriate amounts to the welding wire in conformity with a steel sheet, but those are not a dominant factor of the amount of slag generated.

<Arc Welding Conditions>

(Average Welding Current)

When an average welding current is low level, plasma airflow becomes low speed, and the atmospheric air can be further suppressed from being entrained in the area just under the arc by the plasma airflow. For this reason, the average welding current is preferably 270 A or less, and more preferably 250 A or less.

As the lower limit of the average welding current, it is preferably 70 A or more from the standpoint of arc stability.

(Pulse Current Control)

It is preferred that the welding is pulse welding in which pulse current is controlled from the standpoint that spray transfer can be performed stably and entrainment of the atmospheric air by arc instability can be suppressed.

Pulse peak current is preferably 380 A or more and 530 A or less, and is more preferably 400 A or more and 480 A or less.

When the pulse peak current exceeds 530 A, the peak current is too high, and there is a possibility that the amount of the atmospheric air entrained in the arc is slightly increased. On the other hand, when the pulse peak current is smaller than 380 A, the peak current is too low, and there is a possibility that the amount of spatter generated increases.

Pulse peak time (peak width) is preferably 0.5 to 2.0 milliseconds, and is more preferably 1.2 milliseconds or more and 1.6 milliseconds or less.

When the pulse peak time exceeds 2.0 milliseconds, the peak time is too long, and there is a possibility that the amount of the atmospheric air entrained in the arc is slightly increased. On the other hand, when the pulse peak time is smaller than 0.5 milliseconds, the peak current is too low, and there is a possibility that the amount of spatter generated increases.

<Material to be Welded (Work, Base Material)>

As the material to be welded, conventional materials can be used, and examples thereof include a cold-rolled steel sheet and a hot-rolled steel sheet.

Among them, zinc-plated steel sheet is preferred because Zn vaporized by welding heat enters the shielding gas, thereby reducing oxygen partial pressure and nitrogen partial pressure in the shielding atmosphere, and as a result, the increase of oxygen and nitrogen in the molten metal can be suppressed. When the basis weight of zinc plated is too large, there is a possibility that the amount of spatter generated slightly increases. For this reason, the basis weight of zinc plated is more preferably 20 to 120 $g/m^2$, and is still more preferably 100 $g/m^2$ or less.

When the material to be welded has a thickness of about 1.0 to 3.0 mm, the welding method in the present invention can be applied to the material to be welded.

<Weldment>

The present invention further relates to a method for producing a weldment, including a step of performing welding by the gas-shielded arc welding method, and a weldment welded by the gas-shielded arc welding method.

Examples of the weldment include automobile underbody parts, and of those, suspension arm and suspension member are preferred.

(Slag)

It is preferred for the weldment that in slag formation state by visual observation, slag having a short diameter of 5 mm or more is not formed on bead surfaces inside 1 mm or more from the bead toe part excluding a crater part. When the slag is formed within 1 mm from the bead toe part, intermittent formation is more preferred as compared with continuous formation.

<Spatter>

The presence or absence of spatter adhered to a weldment can be visually evaluated. It is preferred that the number of large spatter having a diameter of 1 mm or more adhered to the weldment is 2 or less, and it is more preferred that the large spatter is not entirely adhered to the weldment.

(Bead Shape)

Figure 5:
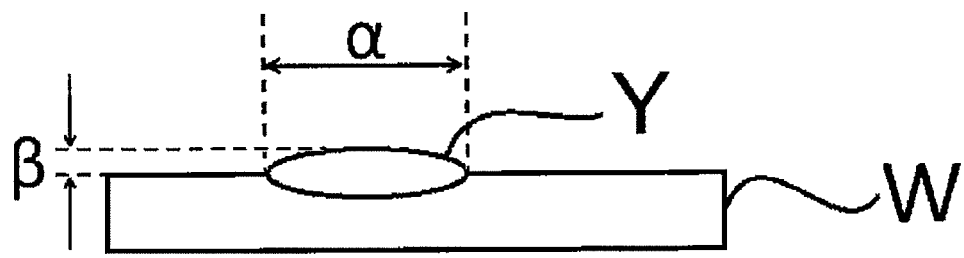
FIG. 5 is a schematic diagram showing a bead width and a weld reinforcement height, used for evaluating bead appearance in the examples.

As the bead shape in the weldment, it is preferred that a ratio between a bead width α and a weld reinforcement height β (bead width α/weld reinforcement height β) in the schematic diagram in FIG. 5 is preferably 3 or more, and more preferably 5 or more, from coatability in a welded bead toe part. Smoother bead shape is preferable. Therefore, the upper limit is not particularly defined.

EXAMPLES

The present invention is further specifically described below by reference to examples, but the present invention is not limited to those examples, the present invention can be carried out by adding changes in a range capable of adopting to the gist of the present invention, and those are included in the technical scope of the present invention. Furthermore, the welding conditions described herein are one example, and the present embodiment is not limited to the following welding conditions.

<Evaluation Method>

(Slag Formation State)

Slag formation state in a weldment was observed visually or using a digital microscope (VHX-900, manufactured by Keyence Corporation). In the "Slag formation state" in Tables 1 and 2, the expression "x" shows that slag having a short diameter of 5 mm or more was formed on bead surfaces inside 1 mm or more from a bead toe part excluding a crater part, the expression "◯" shows that the above slag was not formed, but slag within 1 mm from a bead toe part was continuously formed, and the expression "☉" shows that the above slag was not formed, but slag within 1 mm from a bead toe part was intermittently formed.

(Bead Appearance)

The bead appearance in the weldment was evaluated by visually observing the presence or absence of spatter adhered to the weldment and the bead shape.

The spatter adhered to the weldment means a spatter having a diameter of 1 mm or more, and the presence or absence thereof was evaluated.

The bead shape was evaluated as to whether the value (bead shape) expressed by (bead width/weld reinforcement height) when the torch was placed vertically to the material to be welded and the welding was performed is 5 or less. The bead width is a range expressed by a symbol α in FIG. 5, and the weld reinforcing height is a range expressed by a symbol β in FIG. 5.

In the "bead appearance" in Tables 1 and 2, "☉" means that a spatter adhered to a weldment was not present and the value of the bead shape is 5 or less, and "◯" means that either one of a spatter and a bead shape is poor.

Examples 1 to 45 and Comparative Examples 1 to 4

As basic conditions, bead-on-plate welding was performed using steel sheets each having a thickness of 3.2 mm of SPHC material defined in JIS G3131 and SGHC material defined in JIS G3302 as a base material. The welding speed was 100 cm/min, and torch angle was vertical to a base material.

The composition of a consumable electrode (welding wire) is, in mass %, C: 0.07%, Si: 0.8%, Mn: 1.5%, and P: 0.010%, as a common composition, and the S content is shown in Tables 1 and 2, and the balance is Fe.

An inner diameter of a nozzle (nozzle diameter) used in the welding, a nozzle-base material distance, (inner diameter of nozzle/nozzle-base material distance) (ratio), a flow rate of a shielding gas, (gas flow rate/nozzle inner diameter), gas species, S content in a welding wire, a steel sheet and welding conditions are shown in Tables 1 and 2. The nozzle-base material distance was adjusted by projecting a chip from a nozzle and adjusting a length of the projection.

In "steel sheet" in Tables 1 and 2, "no plating" means an untreated steel sheet that was not subjected to plating. Steel sheets having been subjected to zinc plating in basis weights of 20 g/m$^2$, 45 g/m$^2$, 100 g/m$^2$ and 120 g/m$^2$ were used as base materials in Examples 42 to 45, respectively.

In Examples 34 to 45, pulse welding was performed, and its peak current and peak time (peak width) are shown in Tables 1 and 2.

The above conditions, and evaluation results of slag formation state and bead appearance are shown in Tables 1 and 2.

TABLE 1

| | Nozzle diameter | | | Shielding gas | | |
|---|---|---|---|---|---|---|
| | Nozzle diameter mm | Nozzle-base material distance mm | Ratio — | Flow rate L/min | Gas flow rate/ nozzle inner diameter L/min · mm | Gas species — |
| Example 1 | 16 | 10 | 1.600 | 25 | 1.56 | Ar + 10% $CO_2$ |
| Example 2 | 16 | 15 | 1.067 | 25 | 1.56 | Ar + 10% $CO_2$ |
| Example 3 | 16 | 20 | 0.800 | 25 | 1.56 | Ar + 10% $CO_2$ |
| Example 4 | 16 | 22 | 0.727 | 25 | 1.56 | Ar + 10% $CO_2$ |
| Example 5 | 19 | 10 | 1.900 | 25 | 1.32 | Ar + 10% $CO_2$ |
| Example 6 | 19 | 15 | 1.267 | 25 | 1.32 | Ar + 10% $CO_2$ |
| Example 7 | 19 | 20 | 0.950 | 25 | 1.32 | Ar + 10% $CO_2$ |
| Example 8 | 19 | 22 | 0.864 | 25 | 1.32 | Ar + 10% $CO_2$ |
| Example 9 | 22 | 15 | 1.467 | 25 | 1.14 | Ar + 10% $CO_2$ |
| Example 10 | 16 | 15 | 1.067 | 15 | 0.94 | Ar + 10% $CO_2$ |
| Example 11 | 16 | 15 | 1.067 | 20 | 1.25 | Ar + 10% $CO_2$ |
| Example 12 | 16 | 15 | 1.067 | 18 | 1.13 | Ar + 10% $CO_2$ |
| Example 13 | 16 | 15 | 1.067 | 13 | 0.81 | Ar + 10% $CO_2$ |
| Example 14 | 16 | 15 | 1.067 | 10 | 0.63 | Ar + 10% $CO_2$ |
| Example 15 | 16 | 15 | 1.067 | 8 | 0.50 | Ar + 10% $CO_2$ |
| Example 16 | 19 | 15 | 1.267 | 15 | 0.79 | Ar + 10% $CO_2$ |
| Example 17 | 19 | 15 | 1.267 | 18 | 0.95 | Ar + 10% $CO_2$ |
| Example 18 | 19 | 15 | 1.267 | 13 | 0.68 | Ar + 10% $CO_2$ |
| Example 19 | 19 | 15 | 1.267 | 10 | 0.53 | Ar + 10% $CO_2$ |
| Example 20 | 19 | 15 | 1.267 | 8 | 0.42 | Ar + 10% $CO_2$ |
| Example 21 | 16 | 15 | 1.067 | 25 | 1.56 | Ar + 20% $CO_2$ |
| Example 22 | 16 | 15 | 1.067 | 25 | 1.56 | Ar + 8% $CO_2$ |
| Example 23 | 16 | 15 | 1.067 | 25 | 1.56 | Ar + 5% $CO_2$ |
| Example 24 | 16 | 15 | 1.067 | 25 | 1.56 | Ar + 3% $CO_2$ |
| Example 25 | 16 | 15 | 1.067 | 25 | 1.56 | Ar + 1% $CO_2$ |
| Example 26 | 16 | 15 | 1.067 | 25 | 1.56 | 100% Ar |

| | | | Welding conditions | | | Evaluation results | |
|---|---|---|---|---|---|---|---|
| | Wire S content Mass % | Steel sheet | Average current A | Peak current A | Peak time sec | Slag formation state | Bead appearance |
| Example 1 | 0.005 | No plating | 270 | — | — | ◯ | ◯ |
| Example 2 | 0.005 | No plating | 270 | — | — | ◯ | ◯ |
| Example 3 | 0.005 | No plating | 270 | — | — | ◯ | ◯ |

TABLE 1-continued

| | | | | | | | |
|---|---|---|---|---|---|---|---|
| Example 4 | 0.005 | No plating | 270 | — | — | ○ | ○ |
| Example 5 | 0.005 | No plating | 270 | — | — | ○ | ○ |
| Example 6 | 0.005 | No plating | 270 | — | — | ○ | ○ |
| Example 7 | 0.005 | No plating | 270 | — | — | ○ | ○ |
| Example 8 | 0.005 | No plating | 270 | — | — | ○ | ○ |
| Example 9 | 0.005 | No plating | 271 | — | — | ○ | ○ |
| Example 10 | 0.005 | No plating | 270 | — | — | ⊙ | ⊙ |
| Example 11 | 0.005 | No plating | 270 | — | — | ⊙ | ○ |
| Example 12 | 0.005 | No plating | 270 | — | — | ⊙ | ○ |
| Example 13 | 0.005 | No plating | 270 | — | — | ⊙ | ⊙ |
| Example 14 | 0.005 | No plating | 270 | — | — | ⊙ | ○ |
| Example 15 | 0.005 | No plating | 270 | — | — | ⊙ | ○ |
| Example 16 | 0.005 | No plating | 270 | — | — | ⊙ | ⊙ |
| Example 17 | 0.005 | No plating | 270 | — | — | ⊙ | ⊙ |
| Example 18 | 0.005 | No plating | 270 | — | — | ⊙ | ⊙ |
| Example 19 | 0.005 | No plating | 270 | — | — | ⊙ | ○ |
| Example 20 | 0.005 | No plating | 270 | — | — | ⊙ | ○ |
| Example 21 | 0.005 | No plating | 270 | — | — | ○ | ○ |
| Example 22 | 0.005 | No plating | 270 | — | — | ⊙ | ⊙ |
| Example 23 | 0.005 | No plating | 270 | — | — | ⊙ | ⊙ |
| Example 24 | 0.005 | No plating | 270 | — | — | ⊙ | ⊙ |
| Example 25 | 0.005 | No plating | 270 | — | — | ⊙ | ⊙ |
| Example 26 | 0.005 | No plating | 270 | — | — | ⊙ | ⊙ |

TABLE 2

| | Nozzle diameter | | | Shielding gas | | |
|---|---|---|---|---|---|---|
| | Nozzle diameter mm | Nozzle-base material distance mm | Ratio — | Flow rate L/min | Gas flow rate/ nozzle inner diameter L/min · mm | Gas species — |
| Example 27 | 16 | 15 | 1.067 | 25 | 1.56 | Ar + 10% $CO_2$ |
| Example 28 | 16 | 15 | 1.067 | 25 | 1.56 | Ar + 10% $CO_2$ |
| Example 29 | 16 | 15 | 1.067 | 25 | 1.56 | Ar + 10% $CO_2$ |
| Example 30 | 16 | 15 | 1.067 | 25 | 1.56 | Ar + 10% $CO_2$ |
| Example 31 | 16 | 17 | 0.941 | 25 | 1.56 | Ar + 10% $CO_2$ |
| Example 32 | 16 | 15 | 1.067 | 25 | 1.56 | Ar + 10% $CO_2$ |
| Example 33 | 16 | 15 | 1.067 | 25 | 1.56 | Ar + 10% $CO_2$ |
| Example 34 | 16 | 15 | 1.067 | 25 | 1.56 | Ar + 10% $CO_2$ |
| Example 35 | 16 | 15 | 1.067 | 25 | 1.56 | Ar + 10% $CO_2$ |
| Example 36 | 16 | 15 | 1.067 | 25 | 1.56 | Ar + 10% $CO_2$ |
| Example 37 | 16 | 15 | 1.067 | 25 | 1.56 | Ar + 10% $CO_2$ |
| Example 38 | 16 | 15 | 1.067 | 25 | 1.56 | Ar + 10% $CO_2$ |
| Example 39 | 16 | 15 | 1.067 | 25 | 1.56 | Ar + 10% $CO_2$ |
| Example 40 | 16 | 15 | 1.067 | 24 | 1.56 | Ar + 10% $CO_2$ |
| Example 41 | 16 | 15 | 1.067 | 25 | 1.56 | Ar + 10% $CO_2$ |
| Example 43 | 16 | 15 | 1.067 | 25 | 1.56 | Ar + 10% $CO_2$ |
| Example 43 | 16 | 15 | 1.067 | 25 | 1.56 | Ar + 10% $CO_2$ |
| Example 44 | 16 | 15 | 1.067 | 25 | 1.56 | Ar + 10% $CO_2$ |
| Example 45 | 16 | 15 | 1.067 | 25 | 1.56 | Ar + 10% $CO_2$ |
| Comparative Example 1 | 13 | 15 | 0.867 | 15 | 1.15 | Ar + 10% $CO_2$ |
| Comparative Example 2 | 19 | 23 | 0.826 | 15 | 0.79 | Ar + 10% $CO_2$ |
| Comparative Example 3 | 22 | 11 | 2.000 | 15 | 0.68 | Ar + 10% $CO_2$ |
| Comparative Example 4 | 16 | 23 | 0.696 | 16 | 1.00 | Ar + 10% $CO_2$ |

| | | | Welding conditions | | | Evaluation results | |
|---|---|---|---|---|---|---|---|
| | Wire S content Mass % | Steel sheet | Average current A | Peak current A | Peak time sec | Slag formation state | Bead appearance |
| Example 27 | 0.015 | No plating | 270 | — | — | ⊙ | ⊙ |
| Example 28 | 0.03 | No plating | 270 | — | — | ⊙ | ⊙ |
| Example 29 | 0.06 | No plating | 270 | — | — | ⊙ | ⊙ |
| Example 30 | 0.075 | No plating | 270 | — | — | ⊙ | ⊙ |
| Example 31 | 0.005 | No plating | 270 | — | — | ⊙ | ⊙ |
| Example 32 | 0.005 | No plating | 250 | — | — | ⊙ | ⊙ |
| Example 33 | 0.005 | No plating | 200 | — | — | ⊙ | ⊙ |
| Example 34 | 0.005 | No plating | 270 | 380 | 1.5 | ⊙ | ⊙ |
| Example 35 | 0.005 | No plating | 270 | 460 | 1.5 | ⊙ | ⊙ |

TABLE 2-continued

| | | | | | | | |
|---|---|---|---|---|---|---|---|
| Example 36 | 0.005 | No plating | 270 | 490 | 1.5 | ⊙ | ⊙ |
| Example 37 | 0.005 | No plating | 270 | 530 | 1.5 | ⊙ | ⊙ |
| Example 38 | 0.005 | No plating | 270 | 420 | 0.5 | ⊙ | ⊙ |
| Example 39 | 0.005 | No plating | 270 | 420 | 1.3 | ⊙ | ⊙ |
| Example 40 | 0.005 | No plating | 270 | 420 | 1.6 | ⊙ | ⊙ |
| Example 41 | 0.005 | No plating | 270 | 420 | 2.0 | ⊙ | ⊙ |
| Example 43 | 0.005 | Plating 20 | 270 | 420 | 1.5 | ⊙ | ⊙ |
| Example 43 | 0.005 | Plating 45 | 270 | 420 | 1.5 | ⊙ | ⊙ |
| Example 44 | 0.005 | Plating 100 | 270 | 420 | 1.5 | ⊙ | ⊙ |
| Example 45 | 0.005 | Plating 120 | 270 | 420 | 1.5 | ⊙ | ○ |
| Comparative Example 1 | 0.005 | No plating | 270 | — | — | X | ○ |
| Comparative Example 2 | 0.005 | No plating | 270 | — | — | X | ○ |
| Comparative Example 3 | 0.005 | No plating | 270 | — | — | X | ○ |
| Comparative Example 4 | 0.005 | No plating | 270 | — | — | X | ○ |

It was confirmed from the results shown in Tables 1 and 2 that when the inner diameter D of the nozzle is 15 mm or more, the nozzle-base material distance is 22 mm or less and (inner diameter D of nozzle/nozzle-base material distance) is 0.7 or more and 1.9 or less, the formation of slag having a short diameter of 5 mm or more can be suppressed.

Furthermore, when the shielding gas flow rate is 20 L/min or less, and more preferably 18 L/min or less, or the flow rate expressed by (inner diameter D of nozzle/nozzle-base material distance) is 0.65 to 1.10 L/min·mm, the slag formation state can be further improved.

Furthermore, in Examples 22 to 26, when the Ar content in the shielding gas is 92% or more, a weldment having very excellent slag formation state and bead appearance was obtained.

In Examples 27 to 30, when the S content in the welding wire is 0.015 mass % or more, a weldment having very excellent slag formation state and bead appearance was obtained, regardless of the shielding gas flow rate and the Ar content.

In Examples 32 and 33, when the average welding current is 250 A or less, a weldment having very excellent slag formation state and bead appearance was obtained, regardless of the shielding gas flow rate, the Ar content, and the S content in the welding wire.

In Examples 34 to 41, by performing pulse current control, a weldment having very excellent slag formation state and bead appearance was obtained, regardless of the shielding gas flow rate, the Ar content, the S content in the welding wire and the average welding current.

Furthermore, in Examples 42 to 44, by applying a zinc plating treatment to the base material in a basis weight of 20 to 100 g/m$^2$, a weldment having very excellent slag formation state and bead appearance was obtained.

Although the present invention has been described in detail and by reference to the specific embodiments, it is apparent to one skilled in the art that various modifications or changes can be made without departing the spirit and scope of the present invention.

This application is based on Japanese Patent Application No. 2015-152378 filed Jul. 31, 2015, the disclosure of which is incorporated herein by reference in its entity.

INDUSTRIAL APPLICABILITY

By preventing welding defects such as pits and blow holes, generated by entrainment of the atmospheric air during welding, and oxidation on bead surfaces, repairing work period, labor, costs and the like for repair of a weldment obtained can be reduced.

DESCRIPTION OF REFERENCE NUMERALS AND SIGNS

1 Welding apparatus
10 Robot
11 Welding torch
12 Torch clamp
20 Robot control unit
21 Torch barrel
22 Inner tube
23 Male screw part
30 Welding power supply unit
31 Chip body 31
41 Orifice
61 Contact chip
71 Nozzle
D Inner diameter of nozzle port
Do Inner diameter of straight portion
X Straight portion in nozzle
Y Welded part
W Material to be welded (work)
α Bead width
β Weld reinforcement height

The invention claimed is:

1. A gas-shielded arc welding method, comprising:
feeding a consumable electrode via a welding torch having a nozzle including an orifice; and
welding a welding part of a material to be welded while flowing a shielding gas such that the nozzle shields the welding part from atmospheric air by using the shielding gas rectified by the orifice of the nozzle,
wherein
the consumable electrode contains S in an amount of 0.015 mass % or more based on an entire mass of the consumable electrode,
the shielding gas is a mixed gas comprising 92% or more of Ar, the balance being at least one of carbon dioxide and oxygen, and inevitable impurities,
an inner diameter of the nozzle is 15 mm or more,
a nozzle-base material distance between a tip of the nozzle and the material to be welded is 22 mm or less, and
a ratio of the inner diameter of the nozzle to the nozzle-base material distance is 0.7 or more and 1.9 or less.

2. The gas-shielded arc welding method according to claim 1, wherein a flow rate of the shielding gas is 18 L/min or less.

3. The gas-shielded arc welding method according to claim 1, wherein a ratio of flow rate of the shielding gas to the inner diameter of the nozzle is 0.65 L/min·mm or more and 1.10 L/min·mm or less.

4. The gas-shielded arc welding method according to claim 1, wherein the shielding gas comprises 95% or more of Ar.

5. The gas-shielded arc welding method according to claim 1, wherein the consumable electrode contains S in an amount of 0.020 mass % or more based on the entire mass of the consumable electrode.

6. The gas-shielded arc welding method according to claim 1, wherein an average welding current is 250 A or less.

7. The gas-shielded arc welding method according to claim 1, wherein pulse current control in which a peak current is 380 A or more and 530 A or less and a peak width is 0.5 to 2.0 milliseconds is performed.

8. The gas-shielded arc welding method according to claim 1, wherein the material to be welded is a zinc-plated steel sheet having a basis weight of zinc plated of 20 to 100 $g/m^2$ or more.

9. A method for producing a weldment, the method comprising
welding by the gas-shielded arc welding method according to claim 1.

10. A weldment, welded by the gas-shielded arc welding method according to claim 1.

11. The gas-shielded arc welding method according to claim 1, wherein the nozzle includes a straight portion having an inner diameter same as the inner diameter of the nozzle.

12. The gas-shielded arc welding method according to claim 1, wherein the consumable electrode contains Si in an amount of 0.20 to 2.50 mass % and Mn in an amount of 0.50 to 3.50 mass %.

13. The gas-shielded arc welding method according to claim 1, consisting of the feeding of the consumable electrode and the welding of the welding part.

* * * * *